No. 666,684. Patented Jan. 29, 1901.
J. H. NEAL.
COMPUTING ATTACHMENT FOR TYPE WRITING MACHINES.
(Application filed June 26, 1900.)
(No Model.) 5 Sheets—Sheet 1.

Witnesses. Inventor.
James H. Neal

No. 666,684. Patented Jan. 29, 1901.
J. H. NEAL.
COMPUTING ATTACHMENT FOR TYPE WRITING MACHINES.
(Application filed June 26, 1900.)

(No Model.) 5 Sheets—Sheet 2.

WITNESSES.
C. H. Garrett
J. Murphy

INVENTOR
James H. Neal
by Jas. H. Churchill
Atty.

No. 666,684. Patented Jan. 29, 1901.
J. H. NEAL.
COMPUTING ATTACHMENT FOR TYPE WRITING MACHINES.
(Application filed June 26, 1900.)

(No Model.) 5 Sheets—Sheet 3.

WITNESSES. INVENTOR.
C. H. Garnett James H. Neal
J. Murphy by Jas. H. Churchill
atty.

THE NORRIS PETERS CO., PHOTO-LITHO., WASHINGTON, D. C.

No. 666,684. Patented Jan. 29, 1901.
J. H. NEAL.
COMPUTING ATTACHMENT FOR TYPE WRITING MACHINES.
(Application filed June 26, 1900.)
(No Model.) 5 Sheets—Sheet 4.

WITNESSES.
C. H. Gannett
J. Murphy.

INVENTOR.
James H. Neal
by Jas. H. Churchill
atty.

No. 666,684. Patented Jan. 29, 1901.
J. H. NEAL.
COMPUTING ATTACHMENT FOR TYPE WRITING MACHINES.
(Application filed June 26, 1900.)
(No Model.) 5 Sheets—Sheet 5.

WITNESSES.
J. Murphy
W. W. Drummond

INVENTOR.
James H. Neal
by Jas. H. Churchill
Atty.

UNITED STATES PATENT OFFICE.

JAMES H. NEAL, OF BOSTON, MASSACHUSETTS, ASSIGNOR OF ONE-HALF TO HENRY L. WILSON, OF BROOKLINE, MASSACHUSETTS.

COMPUTING ATTACHMENT FOR TYPE-WRITING MACHINES.

SPECIFICATION forming part of Letters Patent No. 666,684, dated January 29, 1901.

Application filed June 26, 1900. Serial No. 21,623. (No model.)

*To all whom it may concern:*

Be it known that I, JAMES H. NEAL, a citizen of the United States, residing in Boston, in the county of Suffolk and State of Massachusetts, have invented an Improvement in Computing Attachments for Type-Writing Machines, of which the following description, in connection with the accompanying drawings, is a specification, like letters and figures on the drawings representing like parts.

This invention relates to a totalizer or computing device capable of being attached to type-writing machines and operated by the numeral-keys of said machines. For this purpose I employ one or more totalizers, preferably of a construction as will be described, which are mounted on a rod or bar attached to the paper-carriage of the machine, and actuate the said totalizer by mechanism, as will be described, which is operatively connected to the numeral-keys of the machine. These and other features of this invention will be pointed out in the claims at the end of this specification.

Figure 1:
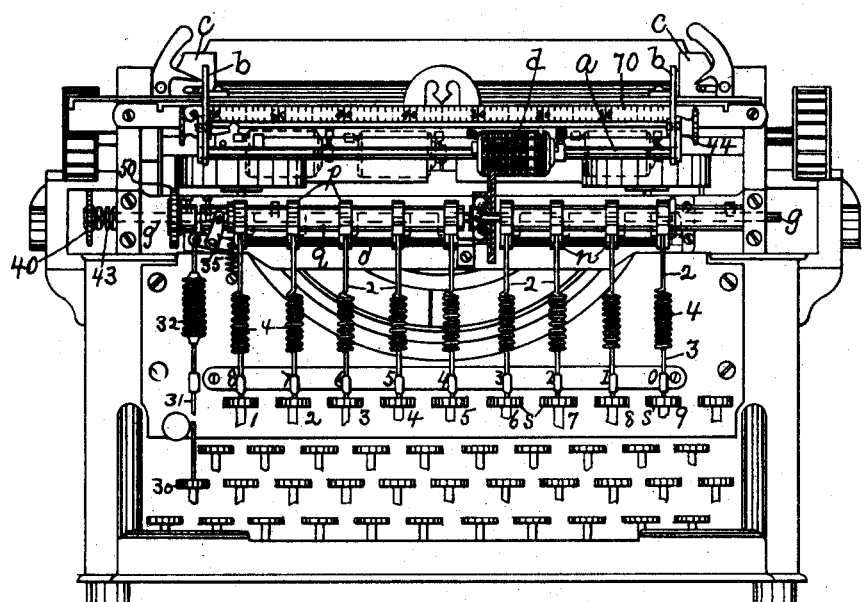
Figure 2:
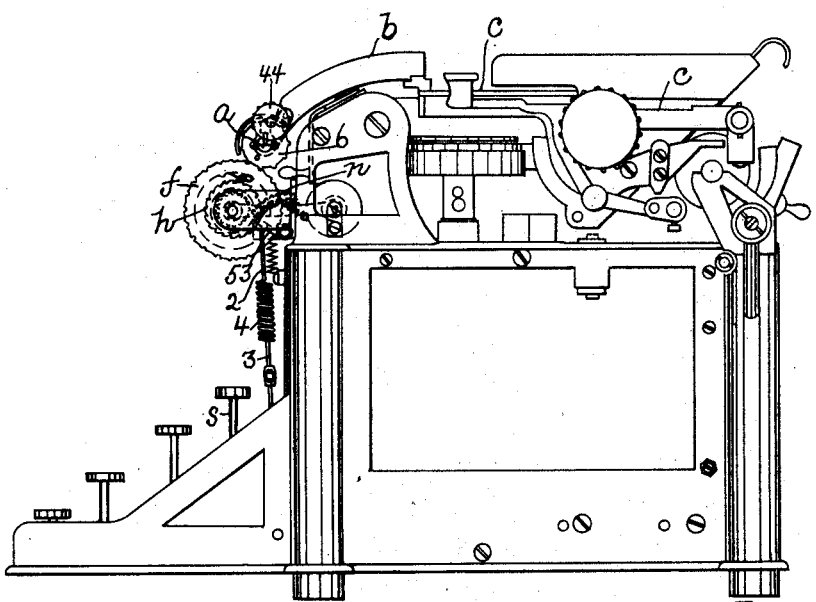
Figure 3:
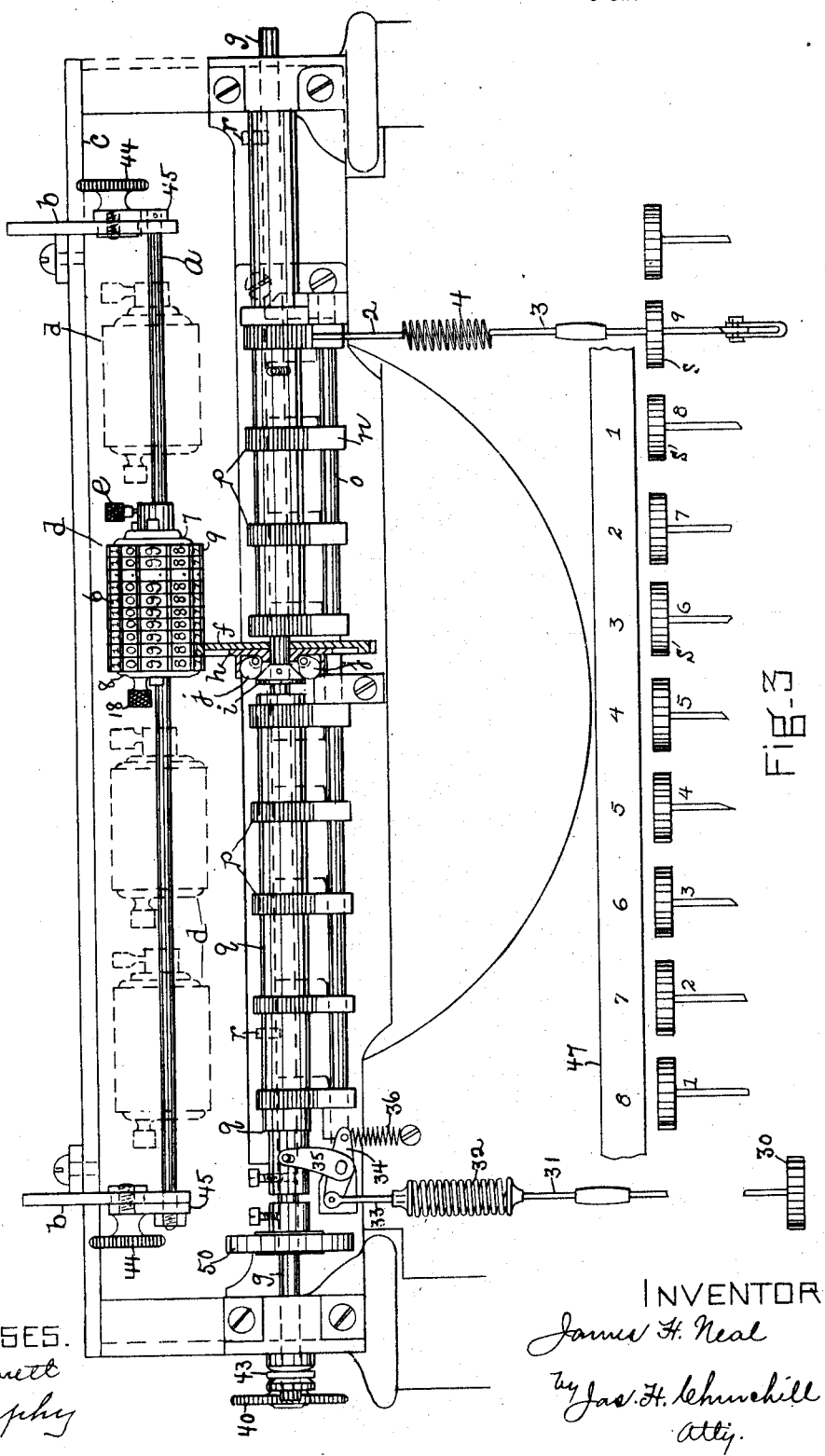
Figure 4:
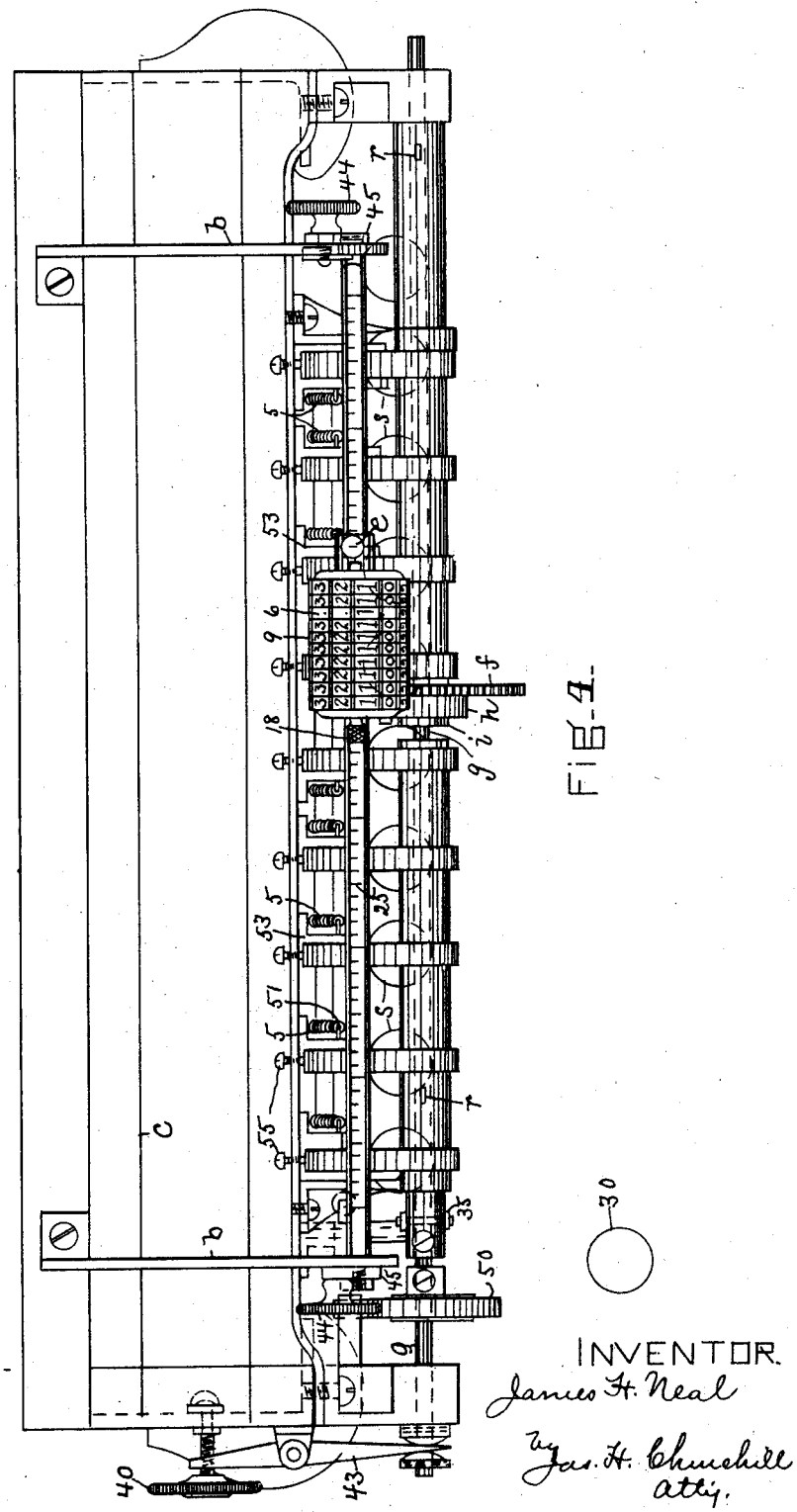
Figure 5:
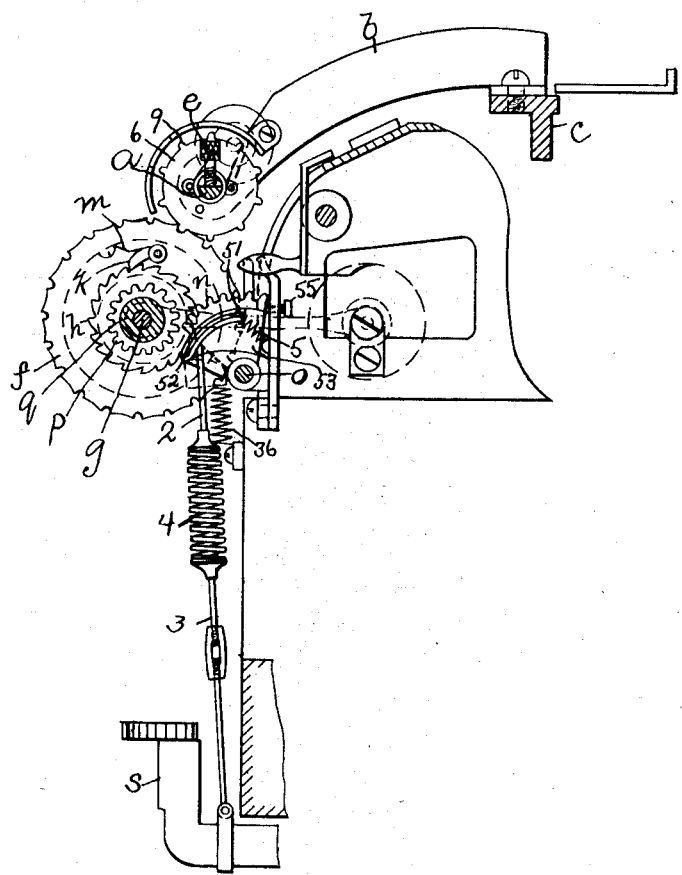
Figure 6:
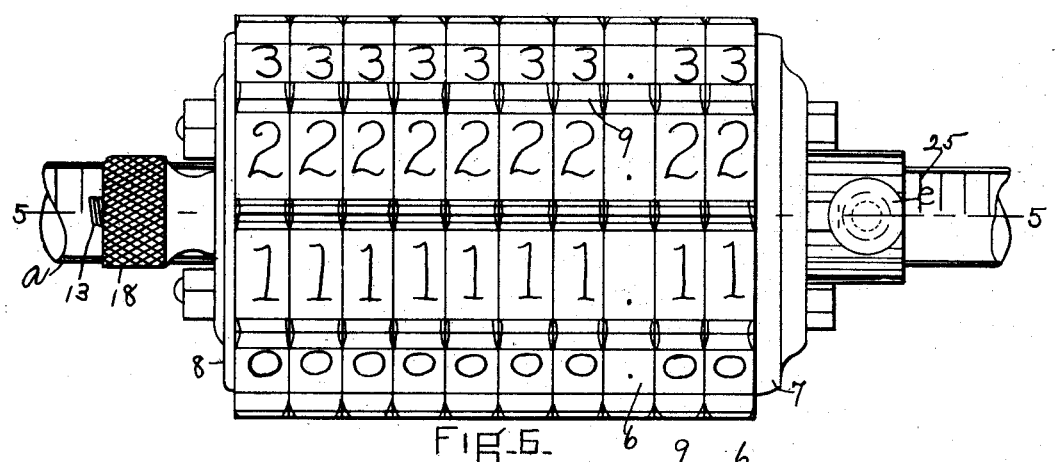
Figure 7:
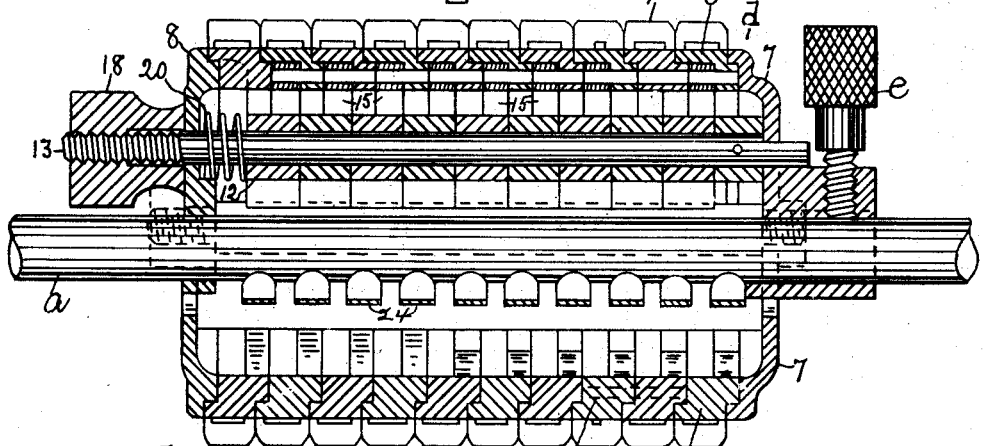
Figure 8:
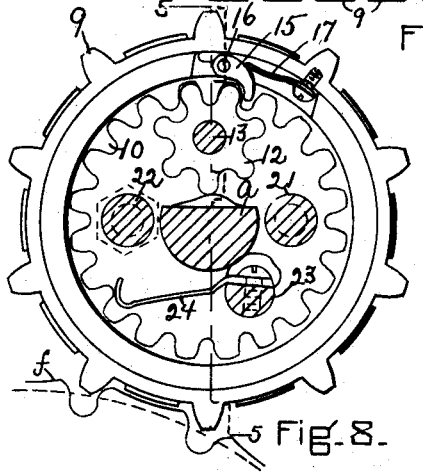
Figure 9:
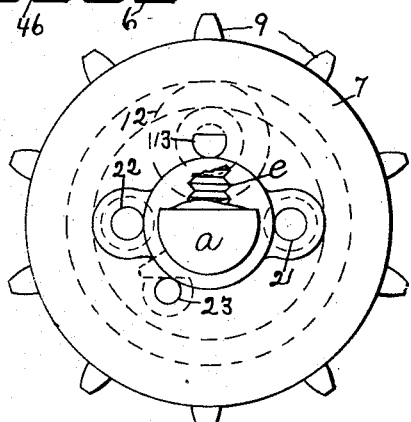

Figure 1 is a front elevation of a type-writing machine provided with a totalizing or computing attachment embodying this invention; Fig. 2, a side elevation of the machine shown in Fig. 1; Fig. 3, a front elevation, on an enlarged scale, of the attachment and a portion only of the type-writing machine shown in Fig. 1; Fig. 4, a top or plan view of the apparatus shown in Fig. 3; Fig. 5, an end elevation of the machine shown in Fig. 3 looking toward the left; Fig. 6, a detail in plan and on an enlarged scale of the totalizer shown in Fig. 1; Fig. 7, a section on the line 7 7, Fig. 6; Fig. 8, a cross-section on the line 8 8, Fig. 7; Fig. 9, an end elevation, with parts broken away, of the totalizer shown in Fig. 6.

Referring to Figs. 1 to 5, $a$ represents a rod or bar removably secured to arms $b$, attached to the paper-carriage $c$ of a type-writing machine, which may be of any suitable or usual construction, such as the Underwood machine, shown and described in United States Patent No. 605,516, dated June 14, 1898, which machine is capable of printing letters and figures. The rod $a$ is extended across and in front of the paper-carriage and has mounted upon it one or more totalizers $d$, preferably of a construction as will be described, and each of which is capable of being moved on the rod $b$ to place the totalizer in any desired position with relation to the width of the paper upon which the columns of figures are printed, and the said totalizer may be secured in its adjusted position on the rod $b$ by a set-screw $e$ or in any other suitable manner. The totalizer $d$ is actuated by a master-wheel, comprising an outer and an inner member, the outer member consisting of a substantially large toothed wheel $f$, loose on a shaft $g$, and the inner member of a smaller ratchet-wheel $h$, (see Fig. 5,) also loose on the shaft $g$, but adapted to be rendered fast thereon by a suitable clutch mechanism, which, as shown, comprises a conical member $i$, fast on the shaft $g$, (see Figs. 1 and 3,) and coöperating jaws or arms $j$, pivoted to the ratchet-wheel $h$ and constituting the loose member of the clutch. The ratchet-wheel $h$ is adapted to be connected with the toothed wheel $f$ when revolved in one direction by a pawl $k$, pivoted to the wheel $f$ and held in engagement with a tooth of the ratchet-wheel $h$ by a spring $m$. (See Fig. 5.) The shaft $g$ is adapted to be rotated in one direction, so as to actuate the totalizer, by a series of segmental gears $n$, mounted on a shaft or rod $o$, having bearings in the framework of the machine, the said segmental gears coöperating with a series of pinions $p$, fast on a sleeve or hollow shaft $q$, rendered fast on the shaft $g$ by keys $r$, (see Figs. 1 and 3,) which latter permit longitudinal movement of the shaft $g$ with relation to the sleeve $q$ for a purpose as will be described.

The segmental gears $n$ are connected to the numeral-keys $s$ of the type-writing machine, and in practice each numeral-key $s$ is connected to a segmental gear $n$, which may be effected, as shown in Fig. 5, by links or rods 2 3 and spring 4, so that when a numeral-key is depressed the segmental gear connected with it is turned, so as to engage its coöperating pinion and partially rotate the shaft $g$, thereby rotating the master-wheel, so as to turn the individual ring or wheel of the totalizer with which the master-wheel is at such time in engagement. When the numeral-key is released, the segmental gear $n$ is returned to its normal position (shown in Fig. 5) by a spring 5, but the outer member of the master-wheel remains stationary, while the inner member or ratchet-wheel $h$ is rotated in the reverse direction by the pinion $p$, in mesh with the segmental gear $n$, which has been moved by its spring 5 back into its normal position. The spring 5 is assisted in moving its segmental gear $n$ by a coiled spring 50, which acts on the shaft $g$ to rotate it in a reverse direction from that in which it is rotated by the segmental gears $n$. The outer member of the master-wheel is held from moving in the reverse direction by resistance in the totalizer, as will be described.

The segmental gears $n$ may be limited or arrested in their forward movement by means of a stud or pin 51, (see Fig. 4,) which is extended through a curved slot 52 in a plate 53, attached to the frame of the machine. The slot 52 is made in the arc of a circle, with the shaft $o$ as a center, and the spring 5 is attached to the pin 51. The backward or return movement of the segmental gears $n$ may be arrested by back-stops, (shown as screws 55.)

The totalizer $d$ may be made as herein shown, and consists of a series of overlapping wheels or rings 6, (see Fig. 7,) which are held between end disks 7 8. The rings 6 are of like construction and are provided on their outer periphery with teeth or projections 9, which are designed to be engaged by the outer member of the master-wheel, and the said rings or wheels are provided on their inner circumference with teeth 10, (see Fig. 8,) which mesh with pinions 12, loose on a shaft 13. (See Fig. 7.) The pinions 12 are made of a width substantially equal to the width of the rings or wheels 6, but are normally located with relation to their coöperating rings 6, so as to be engaged by the internal teeth 10 of one ring and by a pawl 15, carried by the next adjacent ring 6 of the totalizer. The pawl 15 is carried by each ring of the totalizer except the extreme left-hand ring, being mounted on a pin 16 and engaged by a spring 17, which keeps the pawl in engagement with the pinion 12, which is normally in engagement with the internal teeth 10 of the ring 6 next adjacent to the ring carrying the said pawl until said pinion is disengaged from the said pawl, which may be effected, as herein shown, by turning a thumb-screw 18 on the threaded end of the shaft 13, thereby moving said shaft and the pinions thereon longitudinally toward the left (viewing Fig. 7) and against the pressure of a spring 20 until each pinion is disengaged from the pawl carried by the next adjacent ring 6 and is in engagement only with the internal teeth 10 of its own ring. The end disks of the totalizer are joined together by tie-bars 21 22 23, to which latter are secured a series of springs 24, which bear against the internal teeth of the rings and frictionally hold each totalizer-ring in its proper position and against the return movement of the shaft $g$ and inner member of the master-wheel until positively moved by the master-wheel or by the pawl on the next adjacent ring, when the latter is turned sufficiently far to carry forward and move the pinion coöperating with both pawl and a ring the distance of one external tooth.

The rod $a$, on which the totalizer is mounted, is provided in practice with a scale 25, corresponding to the usual scale 70, which is affixed to the paper-carriage or the frame of the machine, (see Fig. 1,) and by setting the totalizer on the rod $a$ at any desired point of the scale thereon the column of figures may be printed upon the paper at any desired place and the total of the column indicated on the totalizer, as the latter will at such time be in engagement with the master-wheel.

The rings 6 of the totalizer are made of a width equal to the space traveled by the paper-carriage upon each depression of a numeral-key, so that the operation of each numeral-key of the type-writer moves the paper-carriage toward the left, (viewing Figs. 1 and 3,) and thus moves the totalizer the same distance in the same direction, which movement of the totalizer disengages the ring 6, which has been rotated by the depression of a numeral-key from the master-wheel and brings the next adjacent ring at the right into engagement with the master-wheel. The segmental gears $n$ are normally disengaged from their coöperating pinions and have a slight movement under the influence of the numeral-keys before being engaged with said pinions, which prevents the segmental gears and keys connected therewith from being disturbed or moved by the other pinions on the hollow shaft $q$ when the latter is rotated by depression of a numeral-key. The numeral-keys are designed to engage the outer member of the master-wheel with a number of teeth on the rings 6, corresponding to the number of the numeral-key, and this result may be effected by providing the segmental gears with a number of teeth sufficient to effect this result, the teeth on one segmental gear $n$ varying from the number of teeth on the other segmental gears.

From the above description it will be understood that the hollow shaft $q$ has fast on it a number of pinions $p$ equal to the number of numeral-keys and that the rotation of a pinion by the depression of a numeral-key effects the rotation of a totalizer-disk a distance sufficient to bring the number corresponding to the numeral-key depressed opposite or in line with the eye of the operator or into position to be plainly seen, which in Figs. 1 and 3 is the position occupied by the numerals "9," and as the numbers are printed on the paper the total is shown on the totalizer.

In order to enable the operator to correct on the totalizer any mistake which might occur from striking the wrong numeral-key, provision is made for turning back the totalizer rings or wheels, which may be effected by moving the shaft 13 longitudinally against the spring 20 by means of the thumb-screw 18, so that the pinions on said shaft will be disengaged from the pawls carried by the next adjacent rings, and each pinion will be engaged with the pawl carried by its own ring, which permits the latter to be turned by hand without effecting movement of the other rings of the totalizer. When the correction has been made, the shaft 13 and pinions 12 may be restored to their normal position by turning the thumb-screw 18 in a reverse direction, which permits the spring 20 to move the shaft 13 and its pinions into their normal positions.

In many type-writing machines two characters are operated by each key, either character of which may be written at will by the depression of what is commonly known as the "shift-key," which moves the paper-carriage either vertically or horizontally, so as to present the paper to a different character on the type-carrier. In order that the totalizer may not be operated when a numeral-key is depressed to effect the printing of another character than the number indicated by said key, I have provided means whereby the master-wheel may be rendered inoperative when the shift-key 30 is depressed. For this purpose the shift-key 30 is connected by rod 31, spring 32, and rod 33 to a lever 34, provided with an arm 35, operatively connected to the clutch-shaft $g$, so that when the shift-key is depressed the shaft $g$ is moved so as to disengage the clutch member $i$ from the jaws or arms $j$, and thus leave the inner member of the master-wheel loose on the shaft $g$, thereby permitting the numeral-keys to be depressed without operating the totalizer. The shaft $g$ may be restored to its normal position when the shift-key is released by a spring 36, assisted by the spring 32. It is also desirable to print figures or numbers on the paper which it is not desired to add—that is, it is desirable to operate the numeral-keys to print the numerals without operating the totalizer, and this result may be effected, as herein shown, by releasing the master-wheel from the shaft $g$, which may be effected by means of a thumb-screw 40, (see Fig. 4,) which acts on a lever 43, connected with the shaft $g$, to move said shaft toward the left, (viewing Figs. 1 and 3,) so as to disengage the clutch member $i$ from its coöperating jaws $j$, and in order to permit this movement of the shaft $g$ without movement of the shift-key provision is made for a downward movement of the rod 33 in its spring 32.

The totalizer-rod may be removably secured in the arms $b$, as herein shown, it being fastened at its ends to arms 45, which are adjustably secured to the arms $b$ by thumb-screws 44, which construction permits the teeth of the totalizer-rings to be accurately adjusted to the teeth of the outer member of the master-wheel. The scale on the rod $a$ enables the totalizer or totalizers to be accurately positioned with relation to the paper on the carriage.

When it is desired to write and add columns containing a decimal point or a comma, a totalizer is used which has one of its rings 6 of double width to offset the space moved by the carriage when the decimal point or comma is written or printed on the paper, and when a ring of double width is used, as herein shown, it may have only a single set of outer and inner teeth and will be operated the same as a single ring.

To facilitate construction, I prefer to make the double ring of two single rings and secure them together as one ring by one or more pins 46, (see Fig. 7;) but in this case the double ring would have only one pawl, as shown in Fig. 7.

The attachment herein shown is also applicable for performing subtraction and division, and for this purpose I employ in connection with the totalizer a number-scale 47, located above the numeral-keys and having on it a series of numbers arranged in line with the numeral-keys and of such denomination which if added to the numeral-key will equal nine—as, for instance, the inner scale and numeral-keys may be represented as follows:

Scale—8, 7, 6, 5, 4, 3, 2, 1, 0.
Keys—1, 2, 3, 4, 5, 6, 7, 8, 9.

To illustrate, suppose it is desired to subtract "47,617" from "78,642." The operator will proceed as follows: first, operate the numeral-keys to indicate on the totalizer the minuend—that is, the number "78,642;" second, turn the thumb-screw 18 so as to prevent carrying forward on the totalizer, and write the "4" of the subtrahend by striking the numeral-key under the "4" on the scale 47, which key is the numeral-key "5;" third, turn the thumb-screw 18 so as to restore the shaft 13 of the totalizer into its normal position, which enables the totalizer to carry forward, and then print the remaining figures of the subtrahend by operating the numeral-keys under the figures on the scale 47. The result is that a number one less than the correct answer is shown on the totalizer. The operation may be clearly understood by carrying out the example. First, operate the numeral-key to indicate on the totalizer the number "78,642." Operate the thumb-screw 18 to prevent carrying forward and strike the numeral-key under "4" of the scale. Result is "78,642." Restore totalizer to normal condition and strike numeral-keys under remaining numbers of subtrahend on scale. Result:

78642
52382
———
31024

The totalizer shows the number "31024," which is one less than the correct answer. Division is accomplished in substantially the same manner by continuous subtraction and is based on the theory of complements in common use.

It will be noticed that the connection between the numeral-keys and the segmental gears is flexible, which permits the use of carbon paper, cards, &c., of various thickness without varying the distance the totalizer-rings are moved by the depression of the keys.

I claim—

1. The combination with a type-writing machine provided with a paper-carriage and with letters and numeral-keys, of a totalizer supported by and movable with said carriage in line therewith, a master means to operate said totalizer, and mechanism operated by the individual numeral-keys to operate said master means and actuate said totalizer without interfering with the operation of the said letter-keys, substantially as described.

2. The combination with a type-writing machine provided with a movable paper-carriage, of a totalizer supported by and movable with said carriage, and mechanism to operate said totalizer, substantially as described.

3. The combination with a type-writing machine provided with a movable paper-carriage, of a totalizer supported by said carriage in line therewith and provided with a plurality of numeral rings or wheels, and means having a fixed position with relation to the type-writing machine and with which the individual rings or wheels of said totalizer are adapted to be engaged to operate said rings or wheels, substantially as described.

4. The combination with a type-writing machine provided with a paper-carriage, of a rod provided with a scale and attached to the carriage to move therewith, a totalizer adjustably mounted on said rod, and means to operate said totalizer, substantially as described.

5. The combination with a type-writing machine, of a totalizer attached thereto and provided with a series of overlapping rings or wheels of a width substantially equal to the space traveled by the movement of the carriage when operated by the depression of a key of the said machine, and with an overlapping ring or wheel of double width and means engaging the end rings to retain the said rings in their overlapped position, substantially as and for the purpose specified.

6. The combination with a type-writing machine provided with a movable paper-carriage and with a shift-key, of a totalizer attached to and supported by the said carriage, means to operate said totalizer, and means operated by the shift-key to render the actuating mechanism for the totalizer inoperative, substantially as described.

7. The combination with a type-writing machine, of a totalizer attached thereto, a shaft, means actuated from said shaft to operate the totalizer, a clutch to couple said means to said shaft, and means to operate said clutch and render the totalizer-actuating means inoperative by said shaft, substantially as described.

8. The combination with a type-writing machine provided with a movable paper-carriage, of a totalizer attached thereto and supported thereby, a shaft, a master-wheel mounted on said shaft and actuated by rotation thereof to operate the totalizer, pinions on said shaft, and segmental gears coöperating with said pinions and operatively connected with the numeral-keys of said machine, substantially as described.

9. The combination with a type-writing machine provided with numeral-keys, and with a totalizer operatively connected thereto, and a numeral-scale attached to the machine and having the figures thereon substantially in line with the numeral-keys and of a denomination which when added to the numeral of the keys will equal nine, substantially as and for the purpose specified.

10. The combination with a type-writing machine provided with a movable paper-carriage, of a totalizer comprising a plurality of numeral rings or wheels provided with external and internal teeth, pawls carried by some of said rings, a shaft provided with a plurality of pinions coöperating with the internal teeth of the said rings and normally in engagement with the pawls carried by the next adjacent rings and means to operate said rings or wheels, substantially as described.

11. The combination with a type-writing machine provided with a movable paper-carriage, of a totalizer comprising a plurality of numeral rings or wheels provided with external and internal teeth, pawls carried by some of said rings, a shaft provided with a plurality of pinions coöperating with the internal teeth of the said rings and normally in engagement with the pawls carried by the next adjacent rings, means to move said shaft longitudinally to disengage the said pinions from the pawls carried by the adjacent rings and means to operate said externally-toothed rings or wheels, substantially as described.

12. The combination with a type-writing machine provided with a movable paper-carriage, of a totalizer comprising a plurality of overlapping rings or wheels provided with external and internal teeth, pawls carried by some of said rings, a shaft provided with pinions coöperating with the internal teeth of said rings and normally in engagement with the pawls carried by the next adjacent rings, means to restrain the movement of said rings and means to operate said externally-toothed wheels or rings, substantially as and for the purpose specified.

13. The combination with a type-writing machine provided with a paper-carriage and with letter and numeral keys, of a rod secured to said carriage, a totalizer mounted on said rod and provided with a plurality of numeral rings or wheels, a shaft provided with a master-wheel adapted to engage with and rotate said rings or wheels individually, and mechanism operated by the individual numeral-keys to effect rotation of said shaft, substantially as described.

14. The combination with a type-writing machine provided with a paper-carriage and with letter and numeral keys, of a totalizer attached to the carriage to move therewith the same distance the carriage is moved by the operation of a key of the machine without interfering with the operation of the said letter-keys, substantially as and for the purpose specified.

15. The combination with a type-writing machine provided with a paper-carriage and with letter and numeral keys, of a totalizer supported by and movable with said carriage and provided with internal carrying mechanism, a master means to operate said totalizer, and mechanism operated by the individual numeral-keys to operate said master means and actuate said totalizer, substantially as described.

16. The combination with a type-writing machine provided with a paper-carriage and with numeral-keys, of a totalizer movable with said carriage, a master means to operate said totalizer, and mechanism operated by the individual numeral-keys to operate said master means and actuate said totalizer, and flexible connections between the said operating mechanism and said numeral-keys to permit the totalizer to be positioned before the impression is effected by the numeral-key, substantially as described.

In testimony whereof I have signed my name to this specification in the presence of two subscribing witnesses.

JAMES H. NEAL.

Witnesses:
JAS. H. CHURCHILL,
J. MURPHY.